United States Patent
Davis et al.

(10) Patent No.: US 11,443,353 B1
(45) Date of Patent: Sep. 13, 2022

(54) SYSTEM AND METHOD OF INTERFACING MULTIPLE PLATFORMS TO GENERATE A CUSTOMIZED GRAPHICAL USER INTERFACE

(71) Applicant: T-MOBILE INNOVATIONS LLC, Overland Park, KS (US)

(72) Inventors: Sean L. Davis, Raymore, MO (US); Michael R. Edwards, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 85 days.

(21) Appl. No.: 17/079,163

(22) Filed: Oct. 23, 2020

(51) Int. Cl.
| | |
|---|---|
| *G06Q 30/04* | (2012.01) |
| *G06F 3/04842* | (2022.01) |
| *H04W 4/50* | (2018.01) |
| *H04W 4/24* | (2018.01) |
| *G06Q 30/02* | (2012.01) |
| *G06Q 30/00* | (2012.01) |
| *G06F 9/451* | (2018.01) |

(Continued)

(52) U.S. Cl.
CPC ......... *G06Q 30/04* (2013.01); *G06F 3/04842* (2013.01); *G06F 9/451* (2018.02); *G06F 9/547* (2013.01); *G06Q 10/10* (2013.01); *G06Q 20/145* (2013.01); *G06Q 20/405* (2013.01); *G06Q 30/016* (2013.01); *G06Q 30/0201* (2013.01); *G06Q 30/0283* (2013.01); *G06Q 30/0631* (2013.01); *H04W 4/24* (2013.01); *H04W 4/50* (2018.02)

(58) Field of Classification Search
CPC ....... H04W 4/029; H04W 4/02; H04W 4/024; H04W 4/24; H04W 4/50; H04W 4/60; G06F 16/26; G06F 16/00; G06F 3/04842; G06F 9/451; G06F 9/547; G06Q 30/04; G06Q 10/10; G06Q 20/145; G06Q 20/405; G06Q 30/016; G06Q 30/0201; G06Q 30/0283; G06Q 30/0631
See application file for complete search history.

(56) References Cited

U.S. PATENT DOCUMENTS

| | | | | |
|---|---|---|---|---|
| 2011/0295749 A1* | 12/2011 | Scalisi | ............ | G06Q 20/10 455/466 |
| 2020/0045519 A1* | 2/2020 | Raleigh | ............ | G06Q 30/02 |
| 2020/0364801 A1* | 11/2020 | Basra | ............ | G06V 30/40 |

FOREIGN PATENT DOCUMENTS

CN 107548496 A * 1/2018 ........... A61B 5/0015

* cited by examiner

*Primary Examiner* — Quoc A Tran

(57) ABSTRACT

A system is disclosed that comprises a presentation system configured to receive a request from a wireless communication service customer and initiate an application programming interface call to an action tool. The system also comprises the action tool that accesses and analyzes customer analytics data and determines and sends potential actions based on the analysis to a rules engine. The system additionally comprises the rules engine that applies rules to select and send an action to the presentation system. The presentation system is further configured to generate and provide a customized GUI comprising a selectable button corresponding to the action to a display of an electronic device associated with the customer. The system further comprises a provisioning system configured to provision the customer with a different wireless communication service plan in response to the electronic device receiving an input to the customized GUI indicating selection of the selectable button.

17 Claims, 5 Drawing Sheets

(51) Int. Cl.
*G06Q 20/40* (2012.01)
*G06Q 30/06* (2012.01)
*G06Q 10/10* (2012.01)
*G06F 9/54* (2006.01)
*G06Q 20/14* (2012.01)
*G06F 17/00* (2019.01)

SYSTEM AND METHOD OF INTERFACING MULTIPLE PLATFORMS TO GENERATE A CUSTOMIZED GRAPHICAL USER INTERFACE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Invoices are generated for numerous reasons. For example, invoices may be generated for wireless communication service subscribers to convey wireless communication charges. In some cases, electronic invoices may be generated on demand by a presentation system based on a request from a customer. An electronic invoice is traditionally generated and presented to the customer as a static document.

SUMMARY

In an embodiment, a system of interfacing multiple platforms to generate a customized graphical user interface (GUI) is disclosed. The system comprises a presentation system configured to receive a request from a wireless communication service customer for an invoice and initiate an application programming interface (API) call to an action tool. The API call comprises an identifier of the wireless communication service customer. The system also comprises the action tool stored in a non-transitory memory that, when executed by a processor, accesses a customer analytics database based on the identifier, analyzes customer analytics data corresponding to the wireless communication service customer based on the identifier, determines a plurality of potential actions for the wireless communication service customer based on the analysis of the customer analytics data, and sends the plurality of potential actions to a rules engine. The system additionally comprises the rules engine stored in a non-transitory memory that, when executed by a processor, receives the plurality of potential actions and applies a set of rules to select at least one action of the plurality of potential actions. The at least one action comprises modifying a wireless communication service plan associated with the wireless communication service customer to a different wireless communication service plan. In response to the API call, the rules engine sends the at least one action to the presentation system. The presentation system is further configured to generate and provide a customized GUI that comprises the invoice and at least one selectable button corresponding to the at least one action to a display of an electronic device associated with the wireless communication service customer. The system further comprises a provisioning system configured to provision the wireless communication service customer with the different wireless communication service plan in response to the electronic device receiving an input to the customized GUI indicating selection of the at least one selectable button.

In another embodiment, a method of interfacing multiple platforms to generate a customized graphical user interface (GUI) is disclosed. The method comprises receiving, by a presentation system, a request from a wireless communication service customer for an invoice and initiating, by the presentation system, an application programming interface (API) call to an action tool. The API call comprises an identifier of the wireless communication service customer. The method also comprises accessing, by the action tool stored in a non-transitory memory and executable by a processor, a customer analytics database based on the identifier, analyzing, by the action tool, customer analytics data corresponding to the wireless communication service customer based on the identifier, determining, by the action tool, a plurality of potential actions for the wireless communication service customer based on the analysis of the customer analytics data, and sending, by the action tool, the plurality of potential actions to a rules engine. The method additionally comprises receiving, by the rules engine stored in a non-transitory memory and executable by a processor, the plurality of potential actions and applying, by the rules engine, a set of rules to select at least one action of the plurality of potential actions. The at least one action comprises applying a credit or waiving a fee in a billing system. The method also comprises sending, by the rules engine, the at least one action to the presentation system in response to the API call and generating and providing, by the presentation system, a customized graphical GUI that comprises the invoice and at least one selectable button corresponding to the at least one action to a display of an electronic device associated with the wireless communication service customer. The method further comprises in response to the electronic device receiving an input to the customized GUI indicating selection of the at least one selectable button: applying the credit or waiving the fee by a billing system and generating and providing, by the presentation system to the display of the electronic device, an updated customized GUI that comprises an updated invoice that reflects the application of the credit or the waiver of the fee.

In yet another embodiment, a method of interfacing multiple platforms to generate a customized graphical user interface (GUI) is disclosed. The method comprises receiving, by a presentation system, a first request from a wireless communication service customer for an invoice during a billing cycle and initiating, by the presentation system, a first application programming interface (API) call to an action tool. The first API call comprises an identifier of the wireless communication service customer. The method also comprises accessing, by the action tool stored in a non-transitory memory and executable by a processor, a customer analytics database based on the identifier, analyzing, by the action tool, customer analytics data corresponding to the wireless communication service customer based on the identifier, determining, by the action tool, a first plurality of potential actions for the wireless communication service customer based on the analysis of the customer analytics data, and sending, by the action tool, the first plurality of potential actions to a rules engine. The method additionally comprises receiving, by the rules engine stored in a non-transitory memory and executable by a processor, the first plurality of potential actions, applying, by the rules engine, a set of rules to select at least a first action of the first plurality of potential actions, sending, by the rules engine, the first action to the presentation system in response to the first API call, and generating and providing, by the presentation system, a first customized GUI that comprises the invoice and at least a first selectable button corresponding to the first action to a display of an electronic device associated with the wireless communication service customer. The method further comprises receiving, by the presentation system, a second request from the wireless communication service customer for the invoice during the billing cycle and initiating, by the presentation system, a second API call to the action tool. The second API call comprises the identifier of the wireless communication service customer. The method also comprises accessing, by the action tool, the customer analytics database based on the identifier in the second API call, analyzing, by the action tool, updated customer analytics data corresponding to the wireless communication service customer based on the identifier in the second API call, determining, by the action tool, a second plurality of potential actions for the wireless communication service customer based on the analysis of the updated customer analytics data, and sending, by the action tool, the second plurality of potential actions to the rules engine. The method additionally comprises receiving, by the rules engine, the second plurality of potential actions, applying, by the rules engine, the set of rules to select at least a second action of the second plurality of potential actions, sending, by the rules engine, the second action to the presentation system in response to the second API call, and generating and providing, by the presentation system, a second customized GUI that comprises the invoice and at least a second selectable button corresponding to the second action to the display of the electronic device. The first action and the second action are different actions associated with a wireless account of the wireless communication service customer. The method further comprises in response to the electronic device receiving an input to the first or second customized GUI indicating selection of the first or second selectable button, implementing the first or second action.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
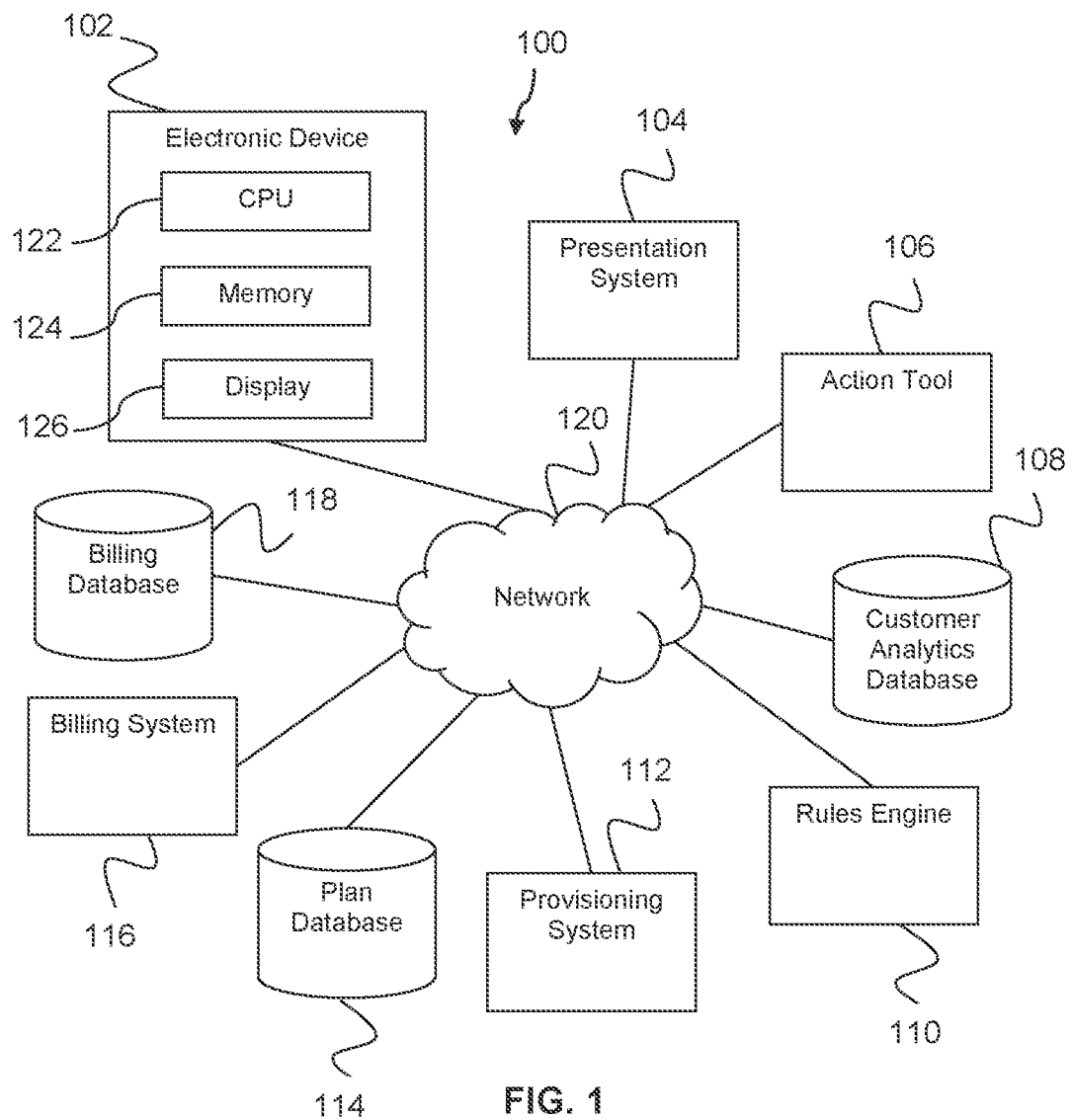
FIG. 1 is a block diagram of a graphical user interface generation system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditionally, electronic invoices are generated and presented to customers as static documents. If the customer looks at the invoice multiple times within the same billing cycle, the same invoice is seen. The pending application is directed to an interactive invoice. In particular, the pending application is directed to the generation of a customized graphical user interface (GUI) that comprises an invoice and a selectable button for a customer. In contrast to how static invoices are generated, the pending application creates interfaces between multiple different platforms and implements a new rules engine in order to accomplish the generation of the customized GUI. This creation of a new executable component (i.e., the rules engine) and the coordination between multiple different platforms that did not interface before for the generation of static invoices results in a particular information technology solution for delivering a customized GUI to a customer (e.g., a wireless communication service customer).

When a wireless communication service customer submits a request for an invoice, a presentation system receives the request and initiates an application programming interface (API) call with an action tool. The API call may include an identifier of the wireless communication service customer. The action tool may apply predictive algorithms to the wireless communication service customer's data (e.g., billing history, usage history, an electronic device buying history, etc.) to project at least one potential action that the wireless communication service customer may wish to perform. A plurality of potential actions may be sent by the action tool to a rules engine and the rules engine may apply a rule set to the plurality of potential actions to select at least one potential action. The selected potential action is provided to the presentation system in response to the API call and is mapped to an actionable input (i.e., a selectable button) that is presented along with the invoice in a customized GUI provided to a display of an electronic device associated with the wireless communication service customer. If the wireless communication service customer selects the selectable button, this may initiate sending of a command to another system to take action or it may initiate display of another GUI screen to complete the action.

For example, if the wireless communication service customer has had overage charges for the last couple of months, the action tool may predict as one potential action that the customer may be interested in changing their limited plan to an unlimited plan. The rules engine may select that action after applying a set of rules and provide that action to the presentation system. The presentation system generates a customized GUI that comprises the requested invoice and a selectable button corresponding to the selected action. If the electronic device associated with the wireless communication service customer receives an input indicating a selection of the selectable button in the customized GUI, a command may be sent to a provisioning system without user involvement, and the provisioning system may provision the wireless communication service customer to the unlimited plan. Thus, the wireless communication service customer may be able to switch their wireless plan with just a click of the button in the customized GUI.

In another example, if the customer usually pays timely but is late paying a bill and has a late fee attached to the bill, the action tool may predict as one potential action that the customer may be interested in requesting a waiver of the late payment fee. The rules engine may select that action after applying a set of rules. One of the rules may comprise a rule that a number of requested fee waivers within a period of time may not exceed a predetermined number of fee waivers, and the rules engine may consult a billing database to confirm that this particular requested fee waiver does not exceed the predetermined number of fee waivers before selecting and providing the action to the presentation system. The presentation system generates a customized GUI that comprises the requested invoice and a selectable button corresponding to the selected action. The customized GUI may also include a window that prompts the customer to select a reason for the lateness (e.g., death in the family, unexpected travel, on vacation). If the electronic device associated with the wireless communication service customer receives an input indicating a selection of the selectable button within the customized GUI, a command may be sent to a billing system without user involvement, and the billing system may waive the late fee. Further, the presentation system may generate and provide an updated customized GUI comprising an updated invoice that reflects the waiver of late fee to the display of the customer's electronic device. Thus, with just a click of the button in the customized GUI, the wireless communication service customer may be able to eliminate a late fee and the waiver of the late fee may be reflected in the updated invoice provided via the updated customized GUI.

In yet another example, if the wireless communication service customer is eligible for a phone upgrade, the action tool may predict as one potential action that the customer may be interested in upgrading their phone. The rules engine may select that action after applying a set of rules and provide that action to the presentation system. The presentation system generates a customized GUI that comprises the requested invoice and a selectable button corresponding to the selected action. If the electronic device associated with the wireless communication service customer receives an input indicating a selection of the selectable button within the customized GUI, this may initiate display of another GUI screen to enable the wireless communication service customer to complete the transaction of purchasing the upgraded phone.

In contrast to the generation of static invoices, the system disclosed herein dynamically generates customized GUIs such that if a wireless communication service customer looks at their invoice more than once during the same billing cycle, the actions selected and presented as corresponding to the selectable button in the customized GUI may vary for example based on updated customer data and/or available promotions between when the invoice requests were received. The system disclosed herein may also comprise a feedback loop. For example, information regarding whether or not a selectable button was selected by the customer may be provided to the action tool and used by the action tool in determining what potential actions to recommend to the mobile communication service customer in the future and/or what potential actions to recommend to other mobile communication service customers.

The customized GUI discussed herein provides benefits to the customer including improved customer experience and increased convenience in managing his or her subscription account through self-service. The customized GUI also benefits the wireless communication service provider by reducing customer interactions with customer care.

Turning now to FIG. 1, a GUI generation system 100 is described. In an embodiment, the GUI generation system 100 comprises an electronic device 102, a presentation system 104, an action tool 106, a customer analytics database 108, a rules engine 110, and a network 120. The GUI generation system 100 may also comprise a provisioning system 112, a plan database 114, a billing system 116, and a billing database 118.

The electronic device 102 may comprise a processor 122, a non-transitory memory 124, and a display 126. The electronic device 102 may comprise a general purpose computer, which is described in greater detail hereinafter with respect to FIG. 4. Specifically, the electronic device 102 may be a desktop computer, a laptop computer, a tablet computer, a wearable computer, a mobile telephone, a personal digital assistant (PDA), a portable electronic device, or another network enabled electronic device. The electronic device 102 may send a request for an invoice to the presentation system 104. For example, the electronic device 102 may be associated with a wireless communication subscriber customer, and the wireless communication service customer may request an invoice of their wireless communication service charges for a billing cycle using the electronic device 102.

The presentation system 104 may comprise a general purpose computer, which is described in greater detail hereinafter with respect to FIG. 4. In an embodiment, the presentation system 104 receives the request for the invoice from the electronic device 102 and initiates an application programming interface (API) call to the action tool 106. The API call may comprise an identifier of the wireless communication service customer.

In an embodiment, the action tool 106 is stored in a non-transitory memory of a server and executed by a processor of the server. In response to the API call, the action tool 106 may access the customer analytics database 108 based on the identifier received in the API call and analyze customer analytics data from the customer analytics database 108 corresponding to the wireless communication service customer based on the identifier. The customer analytics data stored in the customer analytics database 108 may comprise billing histories, mobile communication device usage histories, electronic device buying histories, demographic information, and/or other data. The action tool 106 may determine at least one potential action for the wireless communication service customer based on the analysis of the customer analytics data. In an embodiment, the action tool 106 determines a plurality of potential actions for the wireless communication service customer based on the analysis of the customer analytics data. The action tool 106 may prioritize these potential actions. For example, the action tool 106 may prioritize the potential actions in terms of what action is most likely to elicit a positive response from the wireless communication service customer, in terms of what action will have the most benefit to the wireless communication service provider, or in terms of another prioritization factor. The action tool 106 may send the potential action(s) to the rules engine 110.

In an embodiment, the rules engine 110 is stored in a non-transitory memory of a server and executed by a processor of the server. In some embodiments, the rules engine 110 may be stored in and executed by the same server as the action tool 106. In other embodiments, the rules engine 110 may be stored in and executed by a different server than the action tool 106. The rules engine 110 may receive the potential action(s) from the action tool 106 and apply a set of rules to select at least one action. In one example, one of the rules may comprise if a wireless communication service customer has more than a predetermined number of billing cycles with overage charges, the rules engine 110 selects a plan modification as the action. The rules engine 110 may access the billing database 118 to determine how many billing cycles the wireless communication service customer has with overages. If the rules engine 110 determines that the wireless communication service customer has more than the predetermined number of billing cycles with overage charges, the rules engine 110 may select modifying a wireless communication service plan associated with the wireless communication service customer to a different wireless communication service plan as the action. For example, the rules engine 110 may select switching the wireless communication service customer from a limited plan to an unlimited plan as the action, whereby to reduce the customer's bill by avoiding overage charges.

In another example, one of the rules may comprise that the wireless communication service customer cannot exceed a predetermined number of credits applied or fees waived. The rules engine 110 may access past billing data from the billing database 118 to determine a number of past credits applied or fees waived for the wireless communication service customer based on the past billing data. If the rules engine 110 determines that the number of past credits applied or fees waived for the wireless communication service customer does not exceed the predetermined number of credits applied or fees waived, the rules engine 110 may select applying a credit or waiving a fee in the billing system 116 as the action.

In another example, one of the rules may comprise checking to see if the wireless communication service customer is eligible for an upgrade of their mobile communication device. If the rules engine 110 determines that the wireless communication service customer is eligible, the rules engine 110 may select recommending a device upgrade as the action. The rules discussed above are exemplary rules and the set of rules may comprise other rules without departing from the spirt or scope of the disclosure. Based on application of the set of rules, the rules engine 110 may select one action. If multiple rules apply and multiple actions are eligible for selection, the rules engine 110 may prioritize those actions and select the action with the highest priority. In some embodiments, the rules engine 110 may select a plurality of actions.

In response to the API call from the presentation system 104, the rules engine 110 may send the selected action(s) to the presentation system 104. In response, the presentation system 104 may generate and provide a customized GUI to the display 126 of the electronic device 102. The customized GUI may comprise the requested invoice and a selectable button corresponding to the action received from the rules engine 110. If the presentation system 104 receives more than one action from the rules engine 110, the customized GUI may comprise the requested invoice and a plurality of selectable buttons each corresponding to a different action received from the rules engine 110. Part of building the customized GUI may comprise automatically generating code or logic that underlies the selectable buttons and enables their function—for example linking the button to an API call to activate some other application, interface, or tool.

The electronic device 102 may display the customized GUI on the display 126. The electronic device 102 may also receive an input indicating a selection of a selectable button in the customized GUI. The electronic device 102 may convey the selection of the selectable button to the presentation system 104. In an embodiment, the presentation system 104 receives a message from the electronic device 102 indicating the selection of the selectable button. In response to the message, the presentation system 104 may initiate an API call comprising an indication of the selection of the selectable button to the action tool 106, the rules engine 110, the provisioning system 112, and/or the billing system 116. Alternatively, the customized GUI may have direct action built in as discussed above such that the presentation system 104 may not be involved further after the customized GUI is handed to the electronic device 102.

As discussed above, the action associated with the selectable button in the customized GUI may comprise modifying a wireless communication service plan associated with the wireless communication service customer to a different wireless communication service plan. In such an embodiment, in response to the electronic device 102 receiving the input to the customized GUI indicating selection of the selectable button, the provisioning system 112 may provision the wireless communication service customer with the different wireless communication service plan. The provisioning process performed by the provisioning system 112 may include preparing and equipping a wireless communication network to allow it to provide new services to the wireless communication service customer, giving the wireless communication service customer access to data repositories, and/or granting the wireless communication service customer authorization to systems, network applications, and databases. As part of the provisioning process, the provisioning system 112 may access the plan database 114 to update the wireless communication service plan associated with the wireless communication service provider. For example, the provisioning system 112 may access the plan database 114 to revise the wireless communication service customer's limited plan to an unlimited plan. In an embodiment, any plan conflicts would be systematically resolved without wireless communication service customer interaction.

In an embodiment, the rules engine 112 accesses and analyzes yet to be billed usage data for the wireless communication service customer from the billing system 118 and provides a notification of overages associated with the yet to be billed usage data to the presentation system 104. In such an embodiment, in addition to providing a selectable button corresponding with the action of modifying the wireless communication service customer's plan, the customized GUI generated by the presentation system 104 may comprise the notification of overages associated with the yet to be billed usage data and the selectable button may further corresponding with an action of waiver of overages charges associated with the yet to be billed usage data if the wireless communication service customer changes to the different wireless communication service plan. In response to the electronic device 102 receiving an input to the customized GUI indicating selection of the selectable button, the billing system 118 may waive the overage charges associated with the next billing cycle. For example, the billing system 116 may access the billing database 118 and update billing data associated with the wireless communication service customer to reflect the waiver of the overage charges.

In another example, as discussed above, the action associated with the selectable button in the customized GUI may comprise applying a credit or waiving a fee in the billing system 116. In such an embodiment, in response to the electronic device 102 receiving the input to the customized GUI indicating selection of the selectable button, the billing system 116 may apply the credit or waive the fee. For example, the billing system 116 may access the billing database 118 and update billing data associated with the wireless communication service customer to reflect the credit or the waiver of the fee. In some embodiments, in addition to applying the credit or fee waiver, the presentation system 104 may generate and provide an updated customized GUI to the display 126 of the electronic device 102. The updated customized GUI may comprise an updated invoice that reflects the application of the credit or the waiver of the fee. Thus, the wireless communication service customer may be able to select the selectable button on the invoice in the customized GUI and instantaneously see the application of the credit or fee waiver via the updated customized GUI.

In an embodiment, the rules engine 112 accesses and analyzes yet to be billed usage data for the wireless communication service customer from the billing system 118 and provides a notification of overages associated with the yet to be billed usage data to the presentation system 104. In such an embodiment, in addition to providing a selectable button corresponding with the action of applying a credit or waiving a fee, the customized GUI generated by the presentation system 104 may comprise the notification of overages associated with the yet to be billed usage data and a second selectable button of the customized GUI may correspond with an action of modifying a wireless communication service plan associated with the wireless communication service customer to a different wireless communication service plan. In response to the electronic device 102 receiving an input to the customized GUI indicating selection of the selectable button corresponding to the action of modifying the wireless communication service plan of the customer, the provisioning system 112 may provision the wireless communication service customer with the different wireless communication service plan.

In yet another example, as discussed above, the action associated with the selectable button in the customized GUI may comprise recommending a device upgrade to the wireless communication service customer. In such an embodiment, in response to the electronic device 102 receiving the input to the customized GUI indicating selection of the selectable button, a purchase of a recommended wireless communication device may be initiated. For example, another GUI may be displayed on the display 126 of the electronic device 102 for the wireless communication service customer to complete the purchase of the recommended wireless communication device. Although discussed above with respect to recommending a device upgrade, a device could be recommended to the wireless communication service customer using the system disclosed herein even if the customer is not yet eligible for an upgrade. Additionally, other products besides a wireless communication device and/or services may be recommended to the wireless communication service customer using the system disclosed herein.

In an embodiment, the GUI generation system 100 may comprise a feedback loop. For example, the action tool 106 may receive information regarding the selection of selectable buttons provided in the customized GUIs to customers. The action tool 106 may use that information in determining which potential actions to recommend to the wireless communication service customer in the future and/or other wireless communication service customers.

As described above, the customized GUIs are generated dynamically based on a user request and based on customer analytics data. As the customer analytics data is updated, the potential actions recommended by the action tool 106 may change. Thus, during the same billing cycle, depending on when the wireless communication service customer requests an invoice, the wireless communication service customer could be provided different customized GUIs that comprise the same invoice, but with different actions corresponding to the selectable button in the customized GUI.

The provisioning system 112 and the billing system 118 may comprise one or more general purpose computers. General purpose computers are described in greater detail hereinafter with respect to FIG. 4.

The network 120 promotes communication between the components of the system 100. The network 120 may be any communication network including a public data network (PDN), a public switched telephone network (PSTN), a private network, and/or a combination.

Figure 2:
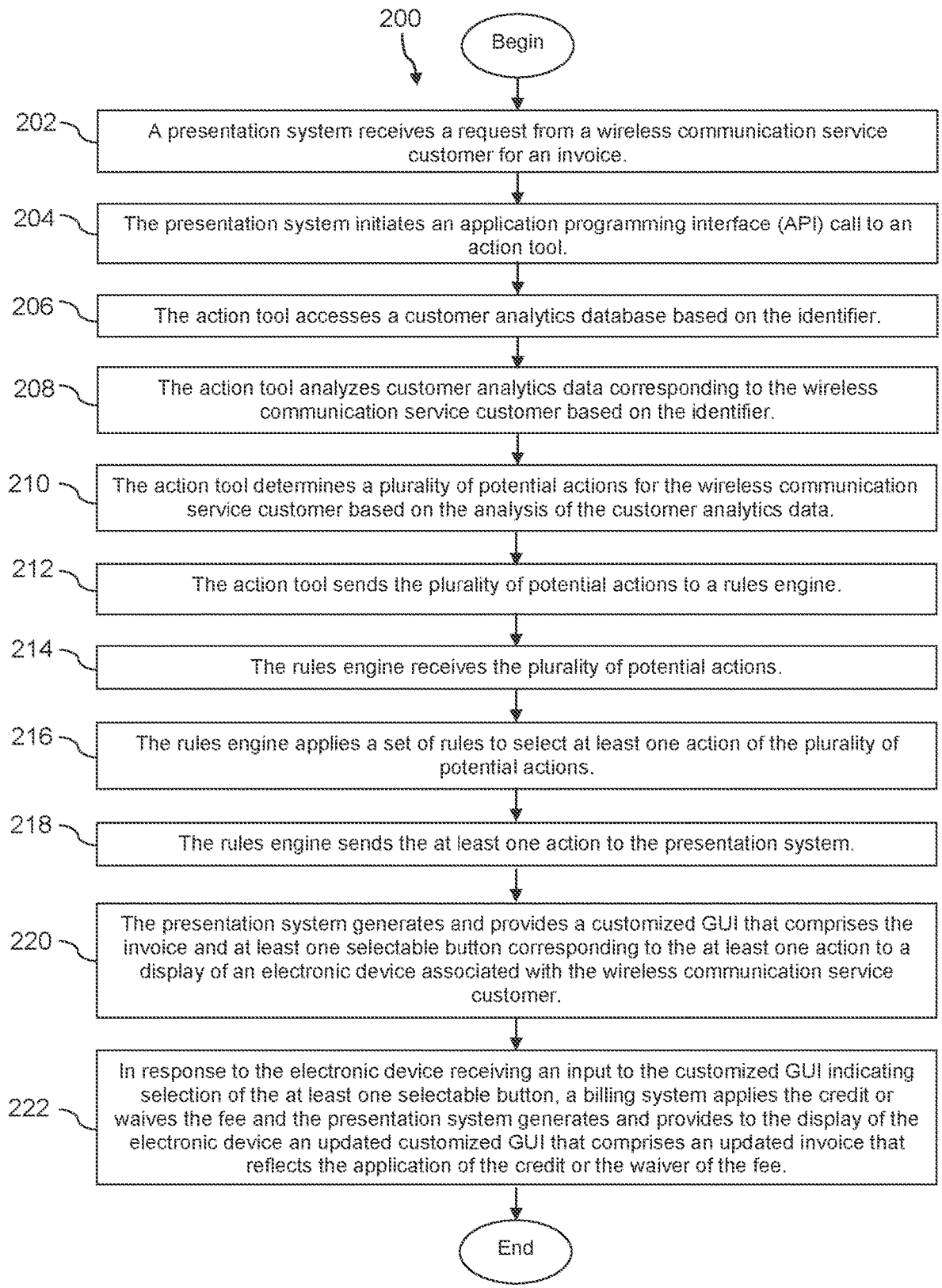
FIG. 2 is a flow chart of a method according to an embodiment of the disclosure.

Turning now to FIG. 2, a method 200 is described. At block 202, a presentation system (e.g., presentation system 104) receives a request from a wireless communication service customer for an invoice. At block 204, the presentation system initiates an API call to an action tool (e.g., action tool 106). At block 206, the action tool accesses a customer analytics database (e.g., customer analytics database 108) based on an identifier in the API call. At block 208, the action tool analyzes customer analytics data corresponding to the wireless communication service customer based on the identifier. At block 210, the action tool determines a plurality of potential actions for the wireless communication service customer based on the analysis of the customer analytics data. At block 212, the action tool sends the plurality of potential actions to a rules engine (e.g., rules engine 110). At block 214, the rules engine receives the plurality of potential actions. At block 216, the rules engine applies a set of rules to select at least one action of the plurality of potential actions. At block 218, the rules engine sends the at least one action to the presentation system. At block 220, the presentation system generates and provides a customized GUI that comprises the invoice and at least one selectable button corresponding to the at least one action to a display of an electronic device associated with the wireless communication service customer (e.g., display 126 of electronic device 102). At block 222, in response to the electronic device receiving an input to the customized GUI indicating selection of the at least one selectable button, a billing system (e.g., billing system 116) applies the credit or waives the fee and the presentation system generates and provides to the display of the electronic device an updated customized GUI that comprise an updated invoice that reflects the application of the credit or the waiver of the fee.

Figure 3A:
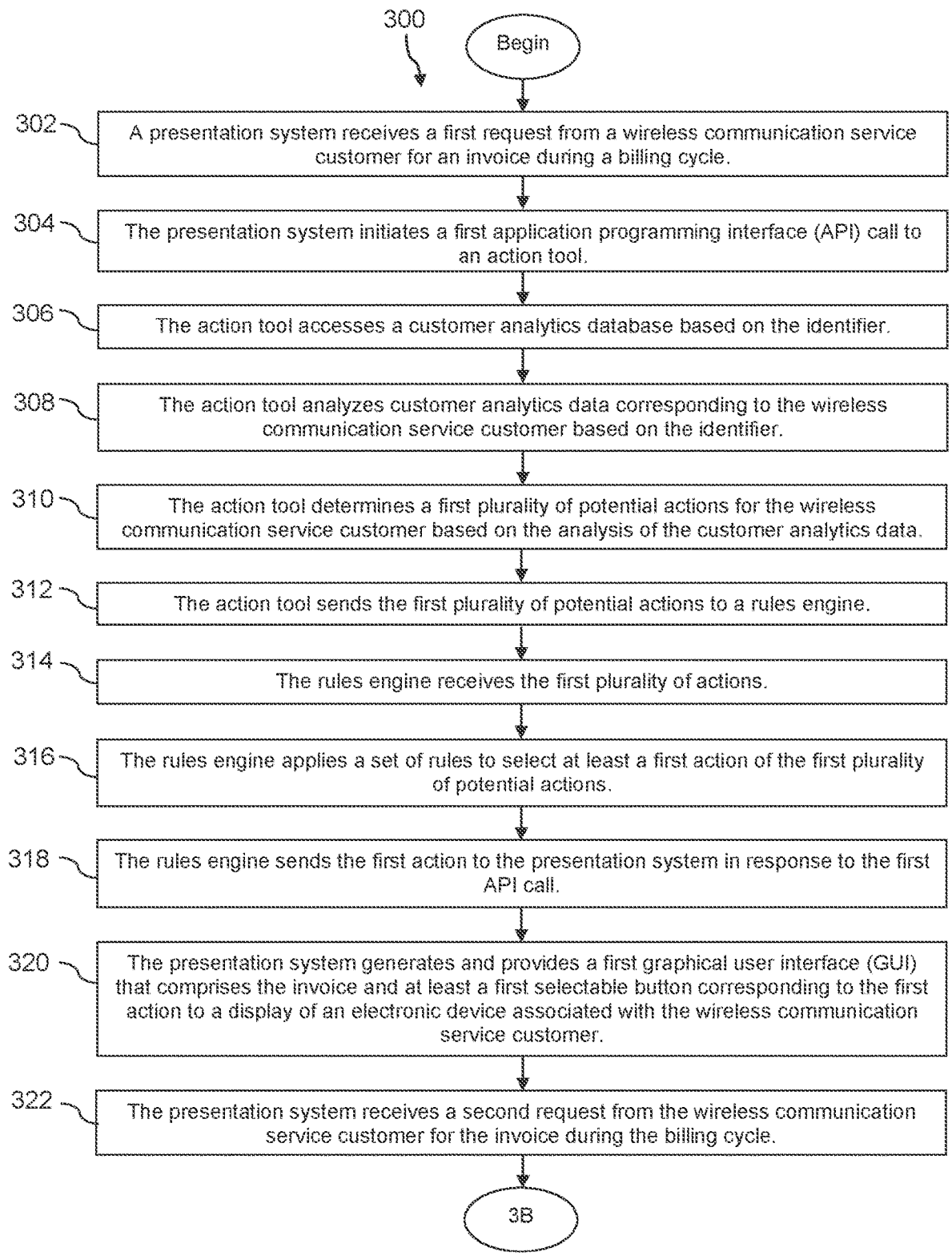
FIGS. 3A and 3B are a flow chart of a method according to an embodiment of the disclosure.
Figure 3B:
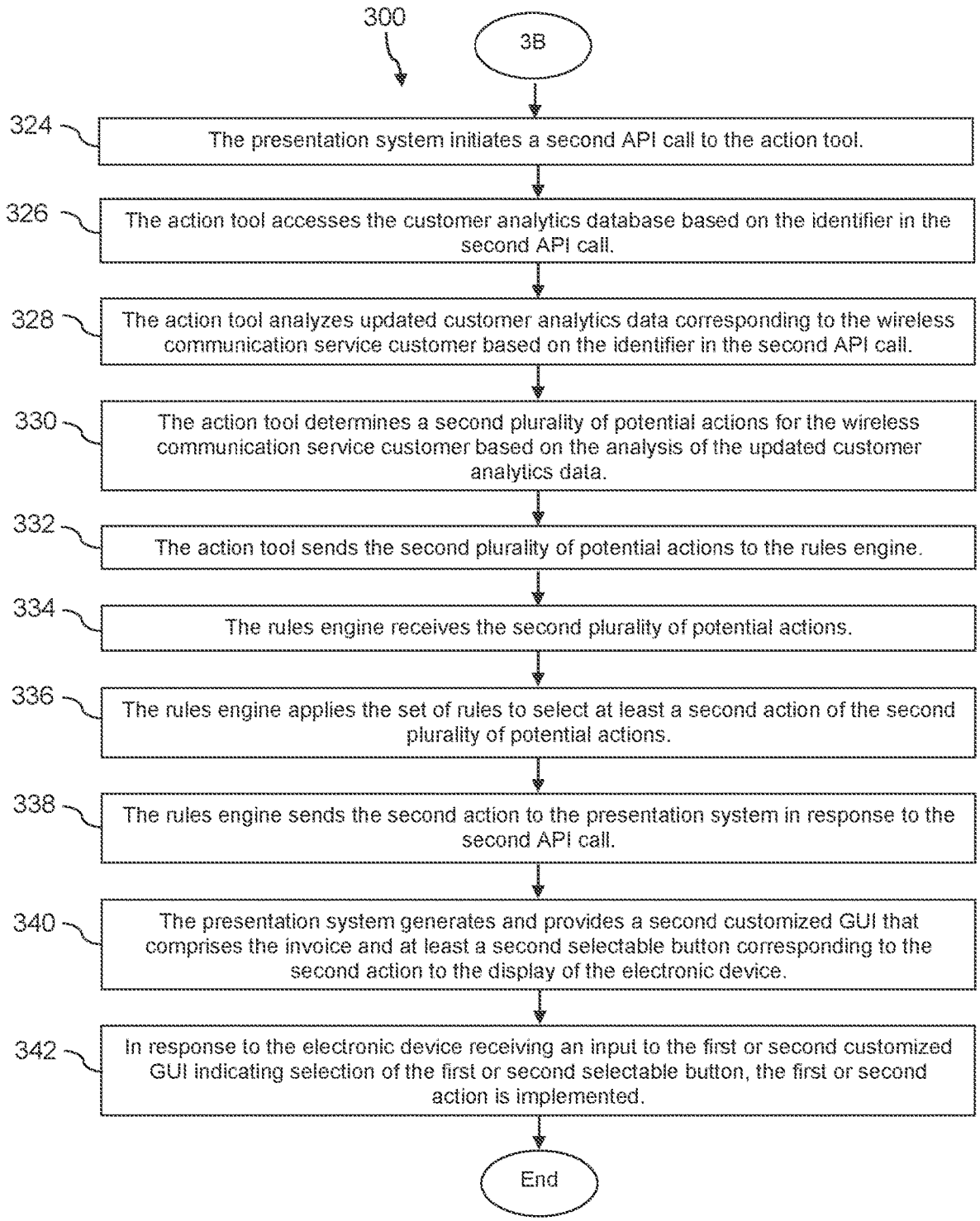

Turning now to FIGS. 3A and 3B, a method 300 is described. At block 302, a presentation system (e.g., presentations system 104) receives a first request from a wireless communication service customer for an invoice during a billing cycle. At block 304, the presentation system initiates a first API call to an action tool (e.g., action tool 106). At block 306, the action tool accesses a customer analytics database based on an identifier provided in the first API call. At block 308, the action tool analyzes customer analytics data corresponding to the wireless communication service customer based on the identifier. At block 310, the action tool determines a first plurality of potential actions for the wireless communication service customer based on the analysis of the customer analytics data. At block 312, the action tool sends the first plurality of potential actions to a rules engine (e.g., rules engine 110). At block 314, the rules engine receives the first plurality of potential actions. At block 316, the rules engine applies a set of rules to select at least a first action of the first plurality of potential actions. At block 318, the rules engine sends the first action to the presentation system in response to the first API call. At block 320, the presentation system generates and provides a first customized GUI that comprises the invoice and at least a first selectable button corresponding to the first action to a display of an electronic device associated with the wireless communication service customer (e.g., display 126 of electronic device 102).

At block 322, the presentation system receives a second request from the wireless communication service customer for the invoice during the billing cycle. At block 324, the presentation system initiates a second API call to the action tool. At block 326, the action tool accesses the customer analytics database based on the identifier in the second API call. At block 328, the action tool analyzes updated customer analytics data corresponding to the wireless communication service customer based on the identifier in the second API call. At block 330, the action tool determines a second plurality of potential actions for the wireless communication service customer based on the analysis of the updated customer analytics data. At block 332, the action tool sends the second plurality of potential actions to the rules engine. At block 334, the rules engine receives the second plurality of actions. At block 336, the rules engine applies the set of rules to select at least a second action of the second plurality of potential actions. In some embodiments, a different set of rules may be applied to select at least the second action. For example, the set of rules may have been updated or changed between the receipt of the first request and the receipt of the second request. At block 338, the rules engine sends the second action to the presentation system in response to the second API call. At block 340, the presentation system generates and provides a second customized GUI that comprises the invoice and at least a second selectable button corresponding to the second action to the display of the electronic device. The first action and the second action are different actions associated with a wireless account of the wireless communication service customer. At block 342, in response to the electronic device receiving an input to the first or second customized GUI indicating selection of the first or second selectable button, the first or second action is implemented.

Figure 4:
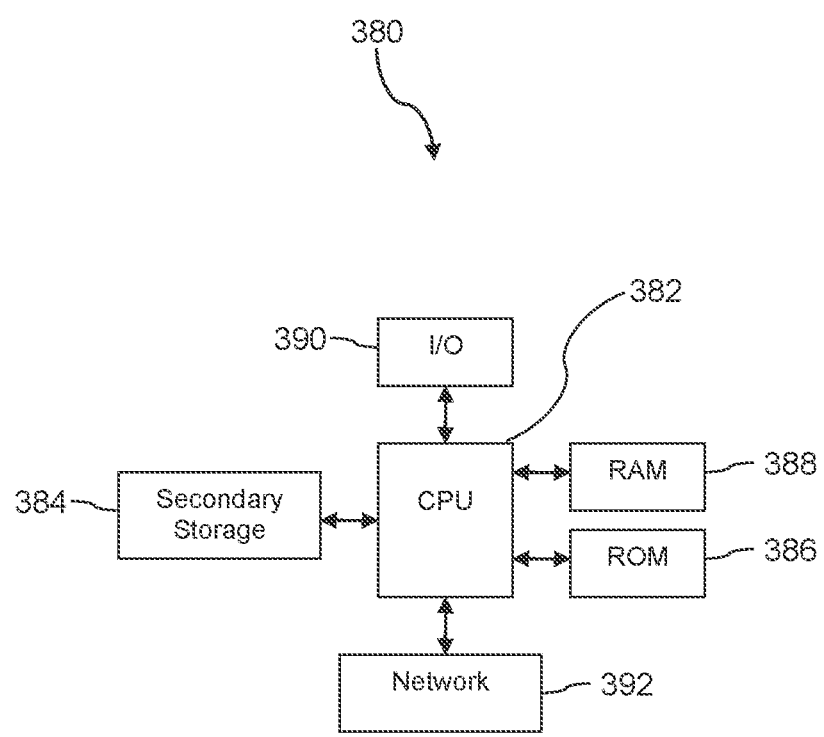
FIG. 4 is block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system of interfacing multiple platforms to generate a customized graphical user interface (GUI), the system comprising:
   a presentation system configured to:
      receive a request from a wireless communication service customer for an invoice, and
      initiate an application programming interface (API) call to an action tool, wherein the API call comprises an identifier of the wireless communication service customer;
   the action tool stored in a non-transitory memory that, when executed by a processor:
      accesses a customer analytics database based on the identifier,
      analyzes customer analytics data corresponding to the wireless communication service customer based on the identifier by applying predictive algorithms to the customer analytics data, wherein the customer analytics data comprises one or more of a billing history of the wireless communication service customer, a usage history of the wireless communication service customer, or an electronic device buying history of the wireless communication service customer,
      determines a plurality of potential actions for the wireless communication service customer based on the analysis of the customer analytics data, and
      sends the plurality of potential actions to a rules engine;
   the rules engine stored in a non-transitory memory that, when executed by a processor:
      receives the plurality of potential actions,
      applies a set of rules to select at least one action of the plurality of potential actions, wherein the at least one action comprises modifying a wireless communication service plan associated with the wireless communication service customer to a different wireless communication service plan, and
      in response to the API call, sends the at least one action to the presentation system, wherein the presentation system is further configured to generate and provide a customized GUI that comprises the invoice and at least one selectable button corresponding to the at least one action to a display of an electronic device associated with the wireless communication service customer, wherein the at least one action selected and presented as corresponding to the at least one selectable button in the customized GUI varies based on current customer analytics data when the request for the invoice is received; and
   a provisioning system configured to:
      provision the wireless communication service customer with the different wireless communication service plan in response to the electronic device receiving an input to the customized GUI indicating selection of the at least one selectable button, wherein the action tool is further configured to determine, based at least in part on information regarding whether the at least one selectable button was selected by the wireless communication service customer, what one or more potential actions to recommend be included in a subsequently generated dynamically customized GUI for the wireless communication service customer or a different wireless communication service customer.

2. The system of claim 1, further comprising the electronic device configured to:
   display the customized GUI comprising the at least one selectable button on the display of the electronic device, and
   receive the input indicating the selection of the at least one selectable button.

3. The system of claim 1, wherein the presentation system is further configured to receive a message from the electronic device indicating the selection of the at least one selectable button and initiate an API call comprising an indication of the selection of the at least one selectable button to at least one of the action tool, the rules engine, or the provisioning system.

4. The system of claim 1, wherein the rules engine is further configured to:
   access and analyze yet to be billed usage data for the wireless communication service customer from a billing system, and
   provide a notification of overages associated with the yet to be billed usage data to the presentation system, wherein the customized GUI comprises the notification of overages associated with the yet to be billed usage data, and wherein the at least one action further comprises a waiver of overage charges associated with the yet to be billed usage data.

5. The system of claim 4, further comprising the billing system, wherein in response to the electronic device receiving an input to the customized GUI indicating selection of the at least one selectable button, the billing system is configured to waive the overage charges.

6. A method of interfacing multiple platforms to generate a customized graphical user interface (GUI), comprising:
   receiving, by a presentation system, a request from a wireless communication service customer for an invoice;
   initiating, by the presentation system, an application programming interface (API) call to an action tool, wherein the API call comprises an identifier of the wireless communication service customer;
   accessing, by the action tool stored in a non-transitory memory and executable by a processor, a customer analytics database based on the identifier;
   analyzing, by the action tool, customer analytics data corresponding to the wireless communication service customer based on the identifier by applying predictive algorithms to the customer analytics data, wherein the customer analytics data comprises one or more of a billing history of the wireless communication service customer, a usage history of the wireless communication service customer, or an electronic device buying history of the wireless communication service customer;

determining, by the action tool, a plurality of potential actions for the wireless communication service customer based on the analysis of the customer analytics data;

sending, by the action tool, the plurality of potential actions to a rules engine;

receiving, by the rules engine stored in a non-transitory memory and executable by a processor, the plurality of potential actions;

applying, by the rules engine, a set of rules to select at least one action of the plurality of potential actions, wherein the at least one action comprises applying a credit or waiving a fee in a billing system;

sending, by the rules engine, the at least one action to the presentation system in response to the API call;

generating and providing, by the presentation system, a customized GUI that comprises the invoice and at least one selectable button corresponding to the at least one action to a display of an electronic device associated with the wireless communication service customer, wherein the at least one action selected and presented as corresponding to the at least one selectable button in the customized GUI varies based on current customer analytics data when the request for the invoice is received;

in response to the electronic device receiving an input to the customized GUI indicating selection of the at least one selectable button:
  applying the credit or waiving the fee by a billing system; and
  generating and providing, by the presentation system to the display of the electronic device, an updated customized GUI that comprises an updated invoice that reflects the application of the credit or the waiver of the fee; and determining, by the action tool based at least in part on information regarding whether the at least one selectable button was selected by the wireless communication service customer, what one or more potential actions to recommend be included in a subsequently generated dynamically customized GUI for the wireless communication service customer or a different wireless communication service customer.

7. The method of claim 6, further comprising:
displaying, on the display, the invoice comprising the at least one selectable button; and
receiving, by the electronic device, the input indicating the selection of the at least one selectable button.

8. The method of claim 7, further comprising:
receiving, by the presentation system, a message from the electronic device indicating the selection of the at least one selectable button; and
initiating an API call comprising an indication of the selection of the at least one selectable button to at least one of the action tool, the rules engine, or the billing system.

9. The method of claim 6, wherein applying the credit or waiving the fee comprises accessing, by the billing system, a billing database and updating billing data associated with the wireless communication service customer to reflect the credit or the waiver of the fee.

10. The method of claim 6, further comprising:
accessing and analyzing, by the rules engine, yet to be billed usage data for the wireless communication service customer from the billing system;
providing, by the rules engine, a notification of overages associated with the yet to be billed usage data to the presentation system, wherein the customized GUI comprises the notification of overages associated with the yet to be billed usage data, and wherein the at least one action further comprises modifying a wireless communication service plan associated with the wireless communication service customer to a different wireless communication service plan; and
in response to the electronic device receiving an input to the customized GUI indicating selection of the at least one selectable button, provisioning, by a provisioning system, the wireless communication service customer with the different wireless communication service plan.

11. The method of claim 6, wherein the set of rules comprises a rule that the wireless communication service customer is allowed a predetermined number of credits applied or fees waived, and wherein applying the set of rules comprises:
accessing, by the rules engine, past billing data from the billing system;
determining, by the rules engine, a number of past credits applied or fees waived based on the past billing data; and
determining, by the billing engine, that the number of past credits applied or fees waived does not exceed the predetermined number of credits applied or fees waived.

12. A method of interfacing multiple platforms to generate a customized graphical user interface (GUI), comprising:
receiving, by a presentation system, a first request from a wireless communication service customer for an invoice during a billing cycle;
initiating, by the presentation system, a first application programming interface (API) call to an action tool, wherein the first API call comprises an identifier of the wireless communication service customer;
accessing, by the action tool stored in a non-transitory memory and executable by a processor, a customer analytics database based on the identifier;
analyzing, by the action tool, customer analytics data corresponding to the wireless communication service customer based on the identifier by applying predictive algorithms to the customer analytics data, wherein the customer analytics data comprises one or more of a billing history of the wireless communication service customer, a usage history of the wireless communication service customer, or an electronic device buying history of the wireless communication service customer;
determining, by the action tool, a first plurality of potential actions for the wireless communication service customer based on the analysis of the customer analytics data;
sending, by the action tool, the first plurality of potential actions to a rules engine;
receiving, by the rules engine stored in a non-transitory memory and executable by a processor, the first plurality of potential actions;
applying, by the rules engine, a set of rules to select at least a first action of the first plurality of potential actions;
sending, by the rules engine, the first action to the presentation system in response to the first API call;

generating and providing, by the presentation system, a first customized GUI that comprises the invoice and at least a first selectable button corresponding to the first action to a display of an electronic device associated with the wireless communication service customer, wherein the first action selected and presented as corresponding to the at least the first selectable button in the first customized GUI varies based on current customer analytics data when the first request for the invoice is received;

receiving, by the presentation system, a second request from the wireless communication service customer for the invoice during the billing cycle;

initiating, by the presentation system, a second API call to the action tool, wherein the second API call comprises the identifier of the wireless communication service customer;

accessing, by the action tool, the customer analytics database based on the identifier in the second API call;

analyzing, by the action tool, updated customer analytics data corresponding to the wireless communication service customer based on the identifier in the second API call by applying the predictive algorithms to the updated customer analytics data, wherein the updated customer analytics data comprises one or more of updated billing history of the wireless communication service customer, updated usage history of the wireless communication service customer, or updated electronic device buying history of the wireless communication service customer;

determining, by the action tool, a second plurality of potential actions for the wireless communication service customer based on the analysis of the updated customer analytics data;

sending, by the action tool, the second plurality of potential actions to the rules engine;

receiving, by the rules engine, the second plurality of potential actions;

applying, by the rules engine, the set of rules to select at least a second action of the second plurality of potential actions;

sending, by the rules engine, the second action to the presentation system in response to the second API call;

generating and providing, by the presentation system, a second customized GUI that comprises the invoice and at least a second selectable button corresponding to the second action to the display of the electronic device, wherein the second action selected and presented as corresponding to the at least the second selectable button in the second customized GUI varies based on updated current customer analytics data when the second request for the invoice is received, and wherein the first action and the second action are different actions associated with a wireless account of the wireless communication service customer;

in response to the electronic device receiving an input to the first or second customized GUI indicating selection of the first or second selectable button, implementing the first or second action; and determining, by the action tool based at least in part on information regarding whether the first or second selectable button was selected by the wireless communication service customer, what one or more potential actions to recommend be included in a subsequently generated dynamically customized GUI for the wireless communication service customer or a different wireless communication service customer.

13. The method of claim 12, wherein implementing the first or second action comprises at least one of:
applying a credit or waiving a fee by a billing system,
provisioning, by a provisioning system, the wireless communication service customer with a different wireless communication service plan, or
initiating a purchase of a recommended wireless communication device.

14. The method of claim 13, wherein provisioning the wireless communication service customer with a different wireless communication service plan comprises accessing, by the provisioning system, a plan database to update a wireless communication service plan associated with the wireless communication service provider to reflect the different wireless communication service plan.

15. The method of claim 13, wherein applying the credit or waiving the fee comprises accessing, by the billing system, a billing database and updating, by the billing system, billing data associated with the wireless communication service customer to reflect the credit or the waiver of the fee.

16. The method of claim 13, wherein initiating the purchase of the recommended wireless communication device comprises displaying another GUI on the display of the electronic device for the wireless communication service customer to complete the purchase.

17. The method of claim 12, further comprising:
accessing and analyzing, by the rules engine, yet to be billed usage data for the wireless communication service customer from a billing system; and
providing, by the rules engine, a notification of overages associated with the yet to be billed usage data to the presentation system, wherein the first or second customized GUI comprises the notification of overages associated with the yet to be billed usage data, wherein the first action or second action comprises a modification of a wireless communication service plan associated with the wireless communication service customer to a different wireless communication service plan and a waiver of overage charges associated with the yet to be billed usage data.

* * * * *